United States Patent Office 3,573,893
Patented Apr. 6, 1971

3,573,893
FERTILIZER FOR CEREALS AND PROCESS FOR ITS MANUFACTURE
Bengt Wadsted, Copenhagen, Denmark, assignor to Marden Anstalt, Vaduz, Liechtenstein
No Drawing. Filed Apr. 15, 1968, Ser. No. 721,166
Claims priority, application Sweden, Apr. 28, 1967, 6,124/67; Dec. 8, 1967, 16,925/67
Int. Cl. C05b 1/00
U.S. Cl. 71—41            14 Claims

ABSTRACT OF THE DISCLOSURE

Fertilizer composition and process of producing same wherein phosphoric acid is treated with ground dolomite, the reaction product being further treated with a selectively calcined dolomite which is either unslaked selectively calcined dolomite or slaked selectively calcined dolomite, and thereafter the reaction mass thus-obtained is treated with a product containing at least one potassium salt selected from the group consisting of potassium chloride and potassium sulfate.

---

This invention relates to the manufacture of cereal fertilizers to cover all of the plant's need for P, K, Mg, Ca and S as well as trace elements such as Cu, Zn, Mn, B, etc., in one single operation per year, by mixing the fertilizer granules with the seed and sowing this mixture.

The steadily increasing application of anhydrous ammonia as the only nitrogen fertilizer, particularly in continuous wheat growing, has presented an enormous advance not only in the saving of labor but also in the covering of the plant's need for nitrogen more adequately and cheaply.

The next problem presenting itself in rational continuous wheat growing, and even in the continuous growing of cereals such as rye, barley, oats and maize, is the following: To find a granular fertilizer which can be mixed with the cereal in question and sown together with the seed, and which will cover all the needs of the plant for one year for P, K, Mg, Ca and S as well as trace elements.

This fertilizer should have the following chemical and physical properties:

The $P_2O_5$, MgO and CaO should be present in compounds only slightly soluble in water but practically completely citrate-soluble and thus available.

The fertilizer should be neutral with a pH between 6.5 and 7.5.

The fertilizer should be non-hygroscopic.

The fertilizer should not cause acidification by giving off any appreciable amount of water soluble $SO_4$-ions to the seed or to the soil surrounding it.

These four propjerties all are important in order to avoid that the fertilizer damages the seed in storage or, after sowing, the germinating plant.

The fertilizer should be as concentrated as possible but still be balanced in such a manner that, when given to the seed in an adequate amount, it will replace all the P, K, Mg, Ca and S as well as the trace elements removed from the soil with the crop. Provided that the straw be plowed back, which is common practice in continuous cereal growing, the quantity of the said elements to be replaced by the fertilizer will thus be the content of these elements in the seed, multiplied by the expected rate of yield.

The fertilizer grains or granules should be physically strong enough to be mixed and sown together with the cereal seed and should produce as little dust as possible when the mixture with seed is shipped and handled.

The advance in the art by this type of fertilizer lies not only in the considerable labor saving but also in the improvement of the crops, not only in quantity but also in quality resulting from the fact that all of the elements mentioned above are available in the immediate neighborhood of the sown seed when it needs these elements the most, namely when germinating.

The type of fertilizer produced by the process according to the present invention complies with all these requirements.

The content of P, K, Mg and Ca in the common kinds of cereals is shown in the following table taken from: "O. Kellner-M. Becker, Grundzüge der Fütterungslehre, Verlag Paul Parey, Hamburg und Berlin 1959." The figures are given in grams per 100 kg. of seed.

TABLE A

|  | P | $P_2O_5$ | K | $K_2O$ | Mg | MgO | Ca | CaO | Mol $P_2O_5$ | Mol $K_2O$ | Mol MgO | Mol CaO | Mol $K_2O/P_2O_5$ | Mol $MgO/P_2O_5$ | Mol $CaO/P_2O_5$ |
|---|---|---|---|---|---|---|---|---|---|---|---|---|---|---|---|
| Wheat | 340 | 782 | 440 | 528 | 140 | 233 | 50 | 70 | 5.53 | 5.50 | 5.65 | 1.25 | 1.01 | 1.02 | 0.23 |
| Rye | 370 | 850 | 500 | 600 | 120 | 200 | 40 | 56 | 6.00 | 6.37 | 5.00 | 1.00 | 1.06 | 0.83 | 0.17 |
| Barley | 390 | 897 | 580 | 695 | 110 | 183 | 50 | 70 | 6.32 | 7.30 | 4.65 | 1.25 | 1.17 | 0.73 | 0.20 |
| Maize | 360 | 830 | 330 | 396 | 110 | 183 | 20 | 28 | 5.86 | 4.20 | 4.65 | 0.50 | 0.72 | 0.80 | 0.08 |
| Oats | 360 | 830 | 410 | 492 | 130 | 218 | 160 | 214 | 5.86 | 5.22 | 5.45 | 3.83 | 0.89 | 0.93 | 0.66 |

Another table given by the Ohio Agricultural Experiment Station for wheat, maize and oats in the following from: "Soil in Relation to Crop Growth. Firman E. Bear, 1965." The figures are expressed in grams per 100 kg. of seed.

TABLE B

|  | P | $P_2O_5$ | K | $K_2O$ | Mg | MgO | Ca | CaO |
|---|---|---|---|---|---|---|---|---|
| Wheat | 373 | 860 | 520 | 625 | 130 | 217 | 50 | 70 |
| Maize | 260 | 598 | 340 | 410 | 108 | 183 | 12 | 17 |
| Oats | 395 | 910 | 419 | 503 | 118 | 196 | 102 | 143 |

It will be seen from the above tables that the loss of MgO with the grain crop is several times larger than the loss of CaO. An adequate supply of available magnesia in the soil is therefore of great importance for continuous grain production. The important part played by magnesium in the physiology of all cereal plants has been dealt with by numerous authors in particular by Welte and Werner. They underline the following characteristics of magnesia:

(1) Mg is the central atom in chlorophyll
(2) Mg activates enzymes thereby activating the metabolism of the plant
(3) Mg plays an important part in the synthesis of aminoacids Most important of all is the interaction by the Mg content on the absorption of phosphate by the plant. When the Mg content in the soil is low, the utilization of phosphate by the plant is low, and the adding of phosphate to the soil will not remedy this situation, unless Mg is added so that a proper balance is obtained between Mg and P. Tests on wheat have shown that, when fertilizing with superphosphate and an adequate amount of magnesium sulphate, the amount of P absorbed in the grain of wheat was almost twice as high as when fertilizing with superphosphate only.

The correctness of this statement has also been proven during the last 20 years or more by Mr. Flemming Juncker, agronomist and landowner, Overgaard, Havnsdal, Denmark, who is the largest Scandinavian wheat producer and a prominent authority on continuous wheat production. He has practised intensive magnesium fertilization combined with phosphate fertilization with basic slag (Thomasmehl), which is not even citrate soluble, with very much better results than with superphosphate, diammoniumphosphate or triple superphosphate and no magnesium fertilization. But he is fully aware that this method is a compromise and that the proper solution to the problem would be to sow the fertilizer wth the seed.

The content of P, K, Mg and Ca in the straw of the common cereals is shown in the following table taken from the same source as Table A. The figures are expressed in grams per 100 kg. of straw.

TABLE C

| | P | $P_2O_5$ | K | $K_2O$ | Mg | MgO | Ca | CaO |
|---|---|---|---|---|---|---|---|---|
| Wheat | 40 | 92 | 720 | 865 | 80 | 125 | 210 | 294 |
| Rye | 80 | 184 | 730 | 877 | 70 | 110 | 230 | 322 |
| Barley | 40 | 92 | 1,200 | 1,440 | 60 | 93 | 260 | 364 |
| Maize | 220 | 510 | 1,090 | 1,310 | 180 | 282 | 500 | 700 |
| Oats | 60 | 138 | 1,450 | 1,740 | 120 | 187 | 350 | 490 |

Table C shows that considerable quantities of the listed elements would have to be returned to the soil in order to compensate for the loss with the straw. This is best done through the plowing back of the straw, which is common practice in continuous wheat growing, as mentioned above. Unless this is done the immediate result will be potassium deficiency, due to the very high K-content in the straw, but magnesium deficiency as well will soon develop.

The quantities of $P_2O_5$, $K_2O$ and MgO that are removed from the soil with the grain of a wheat crop can be estimated from the figures given in Table A. From an area shown with 100 kg. of wheat seed one may expect a crop of 3,200–3,300 kg. of wheat grain, which will contain some 25–26 kg. $P_2O_5$, 17–18 kg. $K_2O$ and 8 kg. Mgo. The fertilizer introduced at the time of sowing should therefore add at least these quantities to the soil, in available form.

It has been thought that $KMgPO_4 \cdot H_2O$ would be ideal as fertilizer for this purpose. This product does present the following advantages:

It is highly concentrated.
It is neutral on the alkaline side, with pH=7.5 when dried to contain only one mol $H_2O$ per mol $KMgPO_4$.
It is only slightly soluble in water but fully soluble in ammonium citrate.

However, the $KMgPO_4 \cdot H_2O$ fertilizers have the disadvantage that they are somewhat hygroscopic, forming $KMgPO_4 \cdot 6H_2O$ which in turn hydrolyzes quite readily to KOH and $Mg_3(PO_4)_2$—$22H_2O$, which renders them unsuitable for staying mixed with seed for any length of time. Another disadvantage is that the proportion between MgO, $K_2O$ and $P_2O_5$ is fixed and cannot be changed at will. Moreover, the processes suggested up till now for the production of $KMgPO_4 \cdot H_2O$ fertilizers have been either uneconomical or at least complicated and requiring large investments of capital.

It is an object of this invention to provide a non-hygroscopic P-, K-, Mg- and Ca-fertilizer for cereals and a process for its manufacture which is more economical than the aforesaid known processes. It is a further object of this invention to tune the proportions of the individual fertilizer components MgO, $K_2O$, CaO and $P_2O_5$ in relation to one another so as to particularly suit any special kind of cereal for which the fertilizer may be intended in each individual case. Further objects will appear in the course of the following detailed description.

The chief characteristic feature of the fertilizer of this invention is that its contents of P, Mg and Ca consist mainly of (I) at least one calcium phosphate in the form of $CaHPO_4$, or $CaHPO_4 \cdot 2H_2O$, (II) calcium carbonate $CaCO_3$ and if desired calcium sulphate $CaSO_4$, (III) at least one magnesium phosphate in the form of $$MgHPO_4 \cdot 3H_2O \text{ or } Mg_3(PO_4)_2 \cdot 4H_2O \text{ or }$$
$$Mg_3(PO_4)_2 \cdot 5H_2O$$

and if desired (IV) calcium magnesium carbonate, while its K content consists of commercial KCl products with their usual impurities and/or commercial $K_2SO_4$ products with their usual impurities, said fertilizer containing in addition phosphates of iron and/or aluminium and if desired trace elements such as B, Cu, Mn, Zn etc. in the usual form in which these trace elements are introduced.

Boron is usually introduced as $Na_2B_4O_7 \cdot 10H_2O$.
Copper is usually introduced as $CuSO_4 \cdot H_2O$ or $$CuSO_4 \cdot 5H_2O \text{ or } CuSO_4 \cdot 3Cu(OH)_2$$

or $CuCO_3 \cdot Cu(OH)_2$ or $2CuCO_3 \cdot Cu(OH)_2$. It can, however, also be introduced as pyrite ash containing copper as CuO.

Mn is usually introduced as $MnSO_4$ or $$2MnSO_4 \cdot MnO \cdot 3H_2O$$

Zinc is usually introduced as $ZnSO_4 \cdot 2H_2O$ or $$ZnSO_4 \cdot 4Zn(OH)_2$$

Mn and Zn may also be introduced as pyrite ash containing Mn usually as MnO or $MnO_2$ and Zn as ZnO.

The process according to this invention for the production of the fertilizer consists in that phosphoric acid is treated first with ground dolomite and subsequently with either unslaked selectively calcined dolomite, $$CaCO_3 \cdot MgO$$

or slaked selectively calcined dolomite, $CaCO_3 \cdot Mg(OH)_2$ whereafter the resultant reaction mass is treated with products containing KCl and/or $K_2SO_4$, and if desired trace elements required by the cereals are added. The first step, that is the treatment with ground dolomite, may be but need not necessarily be carried out with chemically pure dolomite. Chemically pure dolomite is $$CaCO_3 \cdot MgCO_3$$

However, it is an advantage of the process that it is operable also with impure dolomite. Such impure dolomite materials as may be employed in this process may have a mole ratio of $CaCO_3$ to $MgCO_3$ of up to about 2. Generally speaking, therefore, the dolomite materials that can be employed according to this invention may be said to have a proportion of $CaCO_3$ to $MgCO_3$ within the range of from 1.0 to 2.0 mols of $CaCO_3$ per mol $MgCO_3$.

In the aforesaid first step, that is, the treatment of phosphoric acid with ground dolomite, the reaction between these two compounds may be carried out in such a manner that no unreacted dolomite remains in the product from this reaction. However, such a complete conversion of all the ground dolomite is not absolutely necessary; some of it may remain as an unreacted residue which will then be present in the final fertilizer as the aforesaid ingredient (IV).

Also, in the second reaction some uncalcined dolomite contained in the selectively calcined dolomite may but need not remain as an unreacted residue. Whether or not the aforesaid ingredient (IV) will be present in the final fertilizer will depend upon whether or not both of these reactions involve complete conversion of the dolomite.

The process according to the present invention may be carried out in the following manner:

Phosphoric acid from any wet phosphoric acid plant with a content of 22–32% $P_2O_5$ is at first neutralised with dolomite according to the schematic equation:

(I) $2H_3PO_4 + CaCO_3 \cdot MgCO_3 \rightarrow 0.8CaHPO_4$
    $+ MgHPO_4 + 0.1Ca(H_2PO_4)_2$
    $+ 0.1CaCO_3 + 1.9CO_2 + 1.9H_2O$ This process will proceed in a reasonable time to approximately the above equilibrium if carried out at a temperature of 90–100° C. With dolomite ground to −200 mesh, 0.074 mm. opening it requires 2–3 hours to reach an equilibrium with pH=2.8. Thymol blue is thus a good practical indicator. It is feasible to bring the pH higher, for instance to 3.5, but whether this is desirable is a purely economical question. If so the dolomite must be ground to still finer grain size and the volume of the agitator, in which the reaction takes place must be increased in proportion to the longer reaction time required.

The reason why the above reaction reaches a much higher pH value than the corresponding reaction with $CaCO_3$ lies in the fact that while the reaction $$Ca(H_2PO_4)_2 \rightarrow CaHPO_4 + H_3PO_4$$

is very far from quantitative, the corresponding reaction $Mg(H_2PO_4)_2 \rightarrow MgHPO_4 + H_3PO_4$ is practically quantitative.

Like any carbonate neutralization of phosphoric acid the dolomite neutralization is endothermic. As the reaction should furthermore be carried out at a temperature of 90–100° C. the agitation system, in which the reaction takes place, has to be heated.

The $CO_2$ obtained from this reaction is extremely pure and should be recovered. The $CO_2$ will require no washing and only has to be separated from the considerable amount of water vapor that it carries with it.

The reaction slurry from reaction I flows continuously into a blunger where it is treated with slaked, selectively calcined dolomite $CaCO_3.Mg(OH)_2$ which is likewise fed continuously into the blunger. The following two reactions take place successively:

(a) $0.1Ca(H_2PO_4)_2 + 0.1CaCO_3.Mg(OH)_2 \rightarrow$
$\quad 0.1CaHPO_4 + 0.1MgHPO_4 + 0.1CaCO_3 + 0.2H_2O$ (b) $0.06MgHPO_4 + 0.03CaCO_3.Mg(OH)_2 \rightarrow$
$\quad 0.03Mg_3(PO_4)_2 + 0.03CaCO_3 + 0.06H_2O$ or, in sum:

(II) $0.1Ca(H_2PO_4)_2 + 0.13CaCO_3.Mg(OH)_2 \rightarrow$
$\quad 0.1CaHPO_4 + 0.04MgHPO_4 + 0.03Mg_3(PO_4)_2$
$\quad + 0.13CaCO_3 + 0.26H_2O$ The sum of reactions I and II is:

(III) $2H_3PO_4 + CaCO_3.MgCO_3 + 0.13CaCO_3Mg(OH)_2 \rightarrow$
$\quad 0.9CaHPO_4 + 1.04MgHPO_4 + 0.03Mg_3(PO_4)_2$
$\quad + 0.23CaCO_3 + 1.9CO_2 + 2.16H_2O$ Instead of introducing the phosphoric acid as such into reaction I, the phosphoric acid may be introduced in the form of a water slurry of either triple superphosphate, normal superphosphate or enriched superphosphate or a mixture of at least two of these slurries. The content of $P_2O_5$ in these slurries is mainly present as $H_3PO_4$ and $Ca(H_2PO_4)_2$.

Triple superphosphate normally contains 45–47% $P_2O_5$, enriched superphosphate contains 25–33% $P_2O_5$ and normal superphosphate contains 16–21% $P_2O_5$. These products can be applied in any mixture and may originate from any manufacturing plant.

It is preferable that these products have not been dried and granulated as they have to be introduced into the reaction in the form of a water slurry.

While rather complex as compared with phosphoric acid, triple superphosphate slurry consists essentially of free $H_3PO_4$ and $Ca(H_2PO_4)_2$ as well as undissolved rock phosphate and impurities therefrom.

If we assume that the water soluble $P_2O_5$ in the ingoing triple superphosphate consist of 25% free $H_3PO_4$ and 75% $Ca(H_2PO_4)_2$, then 1 mol $P_2O_5$ can be represented by 0.5 mol $H_3PO_4$ and 0.75 mol $Ca(H_2PO_4)_2$.

If 0.50 mol $Ca(H_2PO_4)_2$ of these 0.75 mol $Ca(H_2PO_4)$ can be converted by proper dilution and at a temperature of 90–100° C. according to the reaction $$0.5Ca(H_2PO_4)_2 \rightarrow 0.5CaHPO_4 + 0.5H_3PO_4$$

then it appears that the diluted ingoing slurry of triple superphosphate can be represented with the following compounds per mol $P_2O_5$, namely $$H_3PO_4 + 0.25Ca(H_2PO_4)_2 + 0.5CaHPO_4$$

The above assumptions have been verified by tests on several triple superphosphates to be fairly accurate.

Only the free phosphoric acid will participate in the reaction with dolomite and according to the reaction $H_3PO_4 + 0.5CaCO_3.MgCO_3 \rightarrow 0.4CaHPO_4$
$\quad + 0.5MgHPO_4 + 0.05Ca(H_2PO_4)_2 + 0.05CaCO_3$
$\quad + 0.95CO_2 + 0.95H_2O$ and if we add the $0.25Ca(H_2PO_4)_2$ and the $0.5CaHPO_4$ which have not participated in the reaction, we get a summary of one mol $P_2O_5$ as triple superphosphate slurry reacting with 0.5 mol dolomite $CaCO_3.MgCO_3$ as follows:

(Ia) $H_3PO_4 + 0.5CaCO_3.MgCO_3 + 0.25Ca(H_2PO_4)_2$
$\quad + 0.5CaHPO_4 \rightarrow 0.9CaHPO_4 + 0.5MgHPO_4$
$\quad + 0.3Ca(H_2PO_4)_2 + 0.05CaCO_3 + 0.95CO_2 + 0.95H_2O$ It was found that this process will proceed in a reasonable time to the above equilibrium if carried out at a temperature of 90–100° C. With dolomite ground to −200 mesh, 0.074 mm. opening, it requires about 2 hours to reach an equilibrium with pH=2.4–2.5. Cresol purple is a fairly satisfactory indicator for plant operation but should be checked electrometrically.

The $CO_2$ obtained from this reaction is very pure and of the same quality as from reaction No. I and should be recovered. The reaction slurry from reaction I flows continuously into a blunger, where it is treated with slaked, selectively calcined dolomite $CaCO_3.Mg.(OH)_2$ which is likewise fed continuously into the blunger.

The following two reactions take place successively:

(a) $0.3Ca(H_2PO_4)_2 + 0.3CaCO_3.Mg(OH)_2 \rightarrow$
$\quad 0.3CaHPO_4 + 0.3MgHPO_4 + 0.3CaCO_3 + 0.6H_2O$ and
(b) $0.42MgHPO_4 + 0.21CaCO_3.Mg(OH)_2 \rightarrow$
$\quad 0.21Mg_3(PO_4)_2 + 0.21CaCO_3 + 0.42H_2O$ If (Ia), (a) and (b) are summarized, we obtain (II–A) $H_3PO_4 + 0.5CaCO_3.MgCO_3 + 0.25Ca(H_2PO_4)_2$
$\quad + 0.5CaHPO_4 + 0.51CaCO_3.Mg(OH)_2 \rightarrow$
$\quad 1.2CaHPO_4 + 0.38MgHPO_4 + 0.21Mg_3(PO_4)_2$
$\quad + 0.56CaCO_3 + 0.95CO_2 + 1.97H_2O$ If instead of triple superphosphate enriched superphosphate with 28–30% $P_2O_5$ or a mixture of triple superphosphate and normal superphosphate with a content of 28–30% $P_2O_5$ is applied, the reactions will in principle be the same, because the $P_2O_5$ content in superphosphate and in enriched superphosphate is present in approximately the same proportion between $H_3PO_4$ and $Ca(H_2PO_4)_2$ as in triple superphosphate, namely 25–30% as $H_3PO_4$ and 75–70% as $Ca(H_2PO_4)_2$.

In the reaction with normal superphosphate or enriched superphosphate instead of triple superphosphate the concentration of $P_2O_5$ in the water soluble part of the slurry will be somewhat smaller, for which reason it is desirable to carry out the first neutralization with ground dolomite at a temperature of at least 100° C. to obtain a reasonable reaction time.

The reaction with selectively calcined dolomite is carried to a point of pH=6.3 with methyl red as indicator, according to (a) above, and in the second phase according to (b) above to a point of pH=6.8 with Bromocresol-purple to violet colour.

The reaction above is exothermic because both of the reactions $MgO + H^+ \rightarrow Mg(OH)_2$ and $2H^+ + O^{--} \rightarrow H_2O$ produce heat. This heat will contribute to the drying in the following stage of the process, which takes place in a granulator and dryer.

The reason why reaction II should preferably be carried out in a blunger is that the reaction slurry at certain stages becomes quite thick. This is primarily due to the formation of $MgHPO_4 \cdot 7H_2O$. This compound is, however, rather unstable, and at a later stage in the reaction only the stable $MgHPO_4 \cdot 3H_2O$ is present, rendering the slurry thin enough for its subsequent use.

In the final phase of the neutralization with slaked selectively calcined dolomite there is formed

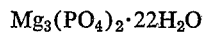
$$Mg_3(PO_4)_2 \cdot 22H_2O$$

which causes temporary crystallization. This compound will, however, very soon give off $17H_2O$ and the very stable $Mg_3(PO_4)_2 \cdot 5H_2O$ will be formed.

The $CaHPO_4$ may be present as anhydrate or as $CaHPO_4 \cdot 2H_2O$, depending upon how far the ultimate drying is carried.

In the finished product all three compounds:

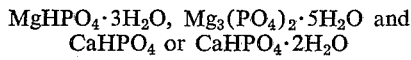
$$MgHPO_4 \cdot 3H_2O,\ Mg_3(PO_4)_2 \cdot 5H_2O \text{ and}$$
$$CaHPO_4 \text{ or } CaHPO_4 \cdot 2H_2O$$

are *100 percent* citrate soluble and thus "available."

The explanation of the fact that all the calcium phosphate in the finished product is citrate soluble is that the $CaHPO_4$ has been precipitated with $CaCO_3$ at a pH value below 3, thus excluding precipitation of the citrate insoluble $Ca_3(PO_4)_2$; in other processes the precipitation is done with $Ca(OH)_2$ at pH levels of 4 or higher, whereby it becomes inevitable that some $Ca_3(PO_4)_2$ gets into the product.

As regards water solubility it was found, in the course of my research, that about 7–8 percent of the $P_2O_5$ in the finished product was water soluble, while 91–92 percent was citrate soluble. In all tests conducted on the finished product the insoluble fraction of $P_2O_5$ was found to be between 1 and 2 percent of the total.

All analytical work was carried out in accordance with "The Official Methods of Analysis of Association of Official Agricultural Chemists, 9th edition, 1960." Published by AOAC, Benjamin Franklin Station, Washington, D.C. By "water solubility" is here understood the solubility of 1 g. of the product in 250 ml. of water at room temperature. After removal of the water soluble, the filter and the residue from the 1 g. was transferred and treated at 65° C. with 100 ml. of ammonium citrate of 1.09 spec. gravity at 20° C. and pH=7.00 determined electrometrically. The $P_2O_5$ content in the residue was then determined, and the total $P_2O_5$ content minus water soluble minus insoluble gave the figure for the citrate soluble.

I have found that when treating 1 g. $CaHPO_4 \cdot 2H_2O$ with 250 ml. water, 0.04 g. dissolved and water solubility of $P_2O_5$ was thus—4 percent of total $P_2O_5$ 1 g. $MgHPO_4 \cdot 3H_2O$ with 250 ml. water, 0.08 g. dissolved and water solubility of $P_2O_5$ was thus—8 percent of total $P_2O_5$ 1 g. $Mg_3(PO_4)_2 \cdot 5H_2O$ with 250 ml. water, 0.08 g. dissolved and water solubility of $P_2O_5$ was thus—3 percent of total $P_2O_5$ 1 g. $CaHPO_4$ with 250 ml. water, 0.025 g. dissolved and water solubility of $P_2O_5$ was thus—2.5 percent of total $P_2O_5$ As regards the selective calcining of dolomite I found it to be of importance that the calcining be carried out at the lowest possible temperature and that the slaking of the $CaCO_3 \cdot MgO$ be done immediately after finishing the calcining. In order to achieve this it is suggested to use the same calcining system as used in the Dorr Oliver Fluo Solids lime reburning system. Reference paper presented to the Technical Association of the Pulp and Paper Industry in New York on Feb. 24, 1964: Fludized Solids Lime Mud Recovery System at S. D. Warren Co., Muskegon, Mich., by H. J. Hotz, Sr., P. Hinkley, A. Erdman, Jr.

In this system a temperature of 820° C. for continuous lime burning has been established, which is about 100° C. lower than the calcining temperature of any other system. The calcining temperature of selectively calcined dolomite in this system can be expected to be around 700–720° C., as against the 800° C. which is normal for other plants.

It will be seen from the reactions that about 15–50 percent of the dolomite entering the plant will have to be selectively calcined. It is suggested to grind the dolomite dry in roller mills, in closed circuit, to minus 100 mesh, 0.147 mm. opening, whereupon the material is passed to a 200 mtsh, 0.074 mm. opening, air separator, the minus 200 mesh material going to reaction I and the plus 200 mesh going to the Fluo Solids selectively calcining plant.

The reaction mass from reaction II is introduced continuously into a granulator plant, together with the adequate amount of potassium chloride or potassium sulphate. This reaction mass is in the form of a moderately thick slurry and eminently suitable for the formation of strong hard granules, with the potassium salts as nucleus and the phosphates as cover. The granulator plant is provided with screening, circulation and drying facilities.

As will be seen from Table A the amount of potassium salt necessary for wheat is 1 mol $K_2O$ per 1 mol $P_2O_5$. Of the other cereals rye and barley require more while maize and oats require less. The quantity of potassium salt to be added will vary accordingly. As it is desirable to produce as concentrated a fertilizer as possible, it will prove most economical to use the most concentrated standard potash products on the market. Potassium chloride in its most concentrated form is sold on the basis of 60 percent $K_2O$, corresponding to 93 percent KCl and the balance essentially NaCl. Potassium sulphate is sold on the basis of 50 percent $K_2O$, corresponding to 93 percent $K_2SO_4$ and the balance mainly $MgSO_4 \cdot H_2O$.

Regarding the choice between using KCl or $K_2SO_4$ the following should be observed:

KCl products are very much cheaper than $K_2SO_4$ products calculated per kg. $K_2O$.

KCl products are in ample supply whereas $K_2SO_4$ products at times are scarce.

The chloride product according to the below examples I and III is somewhat more concentrated than the sulphate products according to Example II and IV and the granules are slightly stronger. KCl is not known to cause any acidification to the soil or any damage to the cereals, the chlorine being absorbed directly by the plant. Thus, if the soil contains and produces enough sulphur to cover the needs of the cereal one may use the chloride products calculated per kg. $K_2O$.

If for some reason a chlorine free product is wanted then the sulphate product according to Example II or IV must be resorted to.

The chlorine product in Examples I and III contains practically no S.

The S content in proportion to the P content and Ca content in most wheats appears from the following Table D.

TABLE D

| | Wheat |
|---|---|
| G. at P | 11 |
| G. mol $P_2O_5$ | 5.5 |
| G. at Ca | 1.25 |
| G. mol CaO | 1.25 |
| G. at S | 4.5–5.5 |
| G. mol $SO_3$ | 4.5–5.5 |

The sulphate product contains by comparison the following:

| | Sulphate products |
|---|---|
| G. at P | 11 |
| G. mol P$_2$O$_5$ | 5.5 |
| G. at Ca | 6.25 |
| G. mol CaO | 6.25 |
| G. at S | 5.5 |
| G. mol SO$_3$ | 5.5 |

Thus if the soil contributes no sulphur at all to the crop the sulphate product would have to be added exclusively as the wheat demands as much as 5.5 g. At of S per 100 kg. wheat. As the plant absorbs the K$^+$ ions from the K$_2$SO$_4$, SO$_4^{--}$ ions would go into the soil and acidify it if it were not for the fact that the fertilizer contains 5 g. atoms excess Ca$^{++}$ ions over and above what the wheat needs. The SO$_4^{--}$ ions consequently remain in the fertilizer as CaSO$_4$.2H$_2$O from which the sulphur is absorbed gradually as the plant grows.

A wheat containing 2 g. AtCl and 4.5 AtS, which is a fairly common type would be best served with a mixture of 20% of the chloride product and 80% of the sulphate product.

However, if high concentration of the product and freedom from chlorine is of secondary importance, it will be found far cheaper to introduce the S by working with enriched superphosphate according to Example V. It appears that by so doing the entire demand for S when growing wheat is covered with CaSO$_4$ instead of K$_2$SO$_4$. In this case the introduction of S costs practically nothing.

When growing other cereals, especially rye which requires more S than wheat, it may be economically advantageous to use normal superphosphate or preferably a mixture of normal superphosphate and enriched superphosphate to introduce the higher amount of S needed.

It appears from the above reactions III and II–A that a product will be obtained with a proportion of $$MgO/P_2O_5 = 1.03-1.13$$

if a pure dolomite is applied in the process. It was found that with the better grade of dolomite available the excess will be between 3 and 8% which is believed to be more than enough for nearly all wheat producing soils.

Wheat has the highest proportion of MgO/P$_2$O$_5$ of the common cereals. Rye, barley, maize and oats have a proportion of MgO/P$_2$O$_5$ 10–30% lower than for wheat.

Without changing the reaction III or II–A it is therefore possible and economical to employ dolomites with considerably higher CaCO$_3$ content than 1 mol CaCO$_3$ per mol MgCO$_3$. Thus for barley where the proportion is MgO/P$_2$O$_5$=0.73 a dolomite with 2 mol CaO$_3$ per mol MgCO$_3$ or 14% MgO and 39.5% CaO instead of 21% MgO and 30% CaO as in pure dolomite may be employed. The reaction will be:

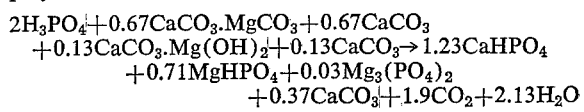

2H$_3$PO$_4$+0.67CaCO$_3$.MgCO$_3$+0.67CaCO$_3$
+0.13CaCO$_3$.Mg(OH)$_2$+0.13CaCO$_3$→1.23CaHPO$_4$
+0.71MgHPO$_4$+0.03Mg$_3$(PO$_4$)$_2$
+0.37CaCO$_3$+1.9CO$_2$+2.13H$_2$O

For rye, maize and oats impure grades of dolomite may also be used preferably in the range of 1.0–1.5 mol CaCO$_3$ per mol MgCO$_3$. The grade 1.5 mol CaCO$_3$ per 1 mol MgCO$_3$ corresponds to 17% MgO and 36% CaO.

If this grade of dolomite is applied for production of wheat fertilizer, somewhat more selectively calcined dolomite must be applied in the final neutralization in order to obtain the required proportion of MgO/P$_2$O$_5$=1.

The reaction would be:

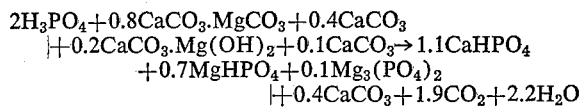

2H$_3$PO$_4$+0.8CaCO$_3$.MgCO$_3$+0.4CaCO$_3$
+0.2CaCO$_3$.Mg(OH)$_2$+0.1CaCO$_3$→1.1CaHPO$_4$
+0.7MgHPO$_4$+0.1Mg$_3$(PO$_4$)$_2$
+0.4CaCO$_3$+1.9CO$_2$+2.2H$_2$O

In actual practice it is believed that about 50% more selectively calcined dolomite of this relatively low grade of dolomite must be used than if the pure Norwegian or Austrian grades are used.

If still lower grade dolomite were used in the production of wheat fertilizer, still more selectively calcined dolomite would be necessary in order to obtain the proportion of MgO/P$_2$O$_5$=1. Thus if dolomite with 2 mol CaCO$_3$ to 1 mol MgCO$_3$ were employed the reaction would be:

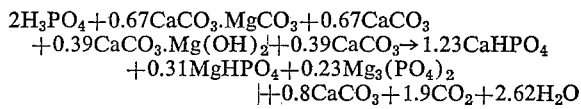

2H$_3$PO$_4$+0.67CaCO$_3$.MgCO$_3$+0.67CaCO$_3$
+0.39CaCO$_3$.Mg(OH)$_2$+0.39CaCO$_3$→1.23CaHPO$_4$
+0.31MgHPO$_4$+0.23Mg$_3$(PO$_4$)$_2$
+0.8CaCO$_3$+1.9CO$_2$+2.62H$_2$O

The use of lower grade dolomite is thus entirely feasible with wheat and this may often constitute a considerable advantage of the process according to the present invention.

The trace elements such as B, Mn, Cu, Zn, etc. can be added in suitable form together with the potassium salts to the granulation plant. The amount of Mn, Cu and Zn expressed in g. per 100 kg. seed is mostly:

| | Mn | Cu | Zn |
|---|---|---|---|
| Wheat | 3.5 | 0.6 | 10.0 |
| Rye | 3.0 | 0.7 | 7.5 |
| Barley | 2.0 | 0.55 | 10.0 |

The quantity removed per year with the crop is seldom available and should be added to the fertilizer.

The practical execution of the process can conveniently be carried out in a slightly modified Dorr-Oliver triple superphosphate plant. Reference: Vincent Sauchelli, Chemistry and Technology of Fertilizers, 1963, Reinhold Publishing Corporation, New York.

When comparing the triple superphosphate process with the present process and weighing the advantages and disadvantages against each other it will be found that the present process offers a better economical aspect than the triple superphosphate process which is in itself an economical process.

As many apparently widely different embodiments of the present invention can be made without departing from the spirit and scope thereof, it is to be understood that the invention is not limited to the specific embodiments referred to in either the above description or the below examples.

EXAMPLE I

Production of P, K, Mg fertilizer for wheat, with K added in the form of KCl 560 g.=446 ml. phosphoric acid from a phosphoric acid plant using Morocco phosphate as raw material was used. The analysis of this acid was:

| | Percent |
|---|---|
| P$_2$O$_5$ | 25.25 |
| H$_2$SO$_4$ | 0.08 |
| Fe$_2$O$_3$ | 0.47 |
| Al$_2$O$_3$ | 0.07 |
| SiO$_2$ | 0.25 |
| H$_2$SiF$_6$ | 0.32 |

This acid was introduced continuously into an agitator to react upon 186 g. of Norwegian dolomite which was likewise introduced continuously into the agitator. The dolomite had been ground to pass 200 mesh screen. The analysis of the dolomite was:

| | Percent |
|---|---|
| MgO | 21.3 |
| CaO | 30.3 |
| CO$_2$ | 47.4 |
| R$_2$O$_3$ and moisture | 1.0 |

The temperature in the agitators was kept at a temperature of 90° C. The time of reaction was 2 hours 30 minutes. The final pH obtained was 2.9. The reaction product was clearly yellow against thymol blue.

The reaction slurry was thereafter brought to react with 28 g. of selectively calcined dolomite. The slurry and the slaked selectively calcined dolomite were both introduced continuously into a blunger.

The selectively calcined dolomite had been produced in an electric furnace at a temperature of 780° C. The calcined product contained 25.1% caustic MgO.

The reaction was carried through its stages of pH=6.3 yellow against methyl red and pH=6.8 violet against bromocresol and finally reached pH=7 in 20 minutes.

Thereafter the reaction mass from the blunger was carried continuously into a granulator provided with screening, circulation and drying facilities together with 160 g. potassium chloride. This potassium chloride product contained 92.5% KCl with 7.5% NaCl and moisture as impurities.

The finished granulated product −4 mm. +2 mm. as obtained from the granulator and drier weighed 510 g. The drying was carried out at 100–110° C. This product showed the following analysis:

| Total $P_2O_5$ of which: | |
|---|---|
| 28.00% or 12.3% P | 28% $P_2O_5$. |
| 2.25% water sol. 0.95% P | |
| 25.40% citrate sol. 11.20% | |
| 0.35% insoluble 0.15% | |
| 18.7% $K_2O$ or 15.65% K | 15.65% K. |
| 9.6% MgO or 5.8% Mg | 9.6% MgO. |
| 13.4% CaO, 9.6% Ca | 13.4% CaO. |
| 14.2% Cl, 14.2% Cl | 14.2%. |
| Crystal water | 14.2%. |
| $CO_2$ | 2.6%. |
| $Fe_2O_3$, $Al_2O_3$, $H_2SiF_6$, etc. not analysed | 2.6%. |
| Total | 100.0%. |

EXAMPLE II

Production of P, K, Mg fertilizer for wheat with K as $K_2SO_4$

Exactly the same reaction mass from the blunger as in Example I was carried continuously into the granulator together with 190 g. potassium sulphate containing 49.7% $K_2O$ corresponding to 92.4% $K_2SO_4$.

The finish granulated product −4 mm. +2 mm. obtained from the granulator and drier weighed 542 g. dried at 110° C. The product showed the following analysis:

| Total $P_2O_5$ of which: | |
|---|---|
| 26.10% $P_2O_5$ or 11.35% P | 26.10% $P_2O_5$. |
| 1.90% water sol. 0.83% P | |
| 23.90% citrate sol. 9.95% | |
| 0.30% insoluble 0.13% | |
| 17.70% $K_2O$, 14.75% K | 17.70% $K_2O$. |
| 9.80% MgO, 5.87% Mg | 9.80% MgO. |
| 12.60% CaO, 9.00% Ca | 12.60% CaO. |
| 16.35% $SO_3$, 6.55% S | 16.35% $SO_3$. |
| Crystal water 12.85% $H_2O$ | 12.85% $H_2O$. |
| 2.40% $CO_2$ | 2.40% $CO_2$. |
| | 97.80%. |
| Balance $Fe_2O_3$, $Al_2O_3$, $H_2SiF_6$, etc., not analysed | 2.20%. |
| Total | 100.00%. |

Both products from Examples I and II have been kept together with the same quantity by weight of wheat for more than half a year without any noticeable detriment to the wheat.

EXAMPLE III

Production of P, K, Mg fertilizer for wheat with K added in the form of KCl 300 g. of granulated triple superphosphate with 47.7% total $P_2O_5$ was pulverized and treated with 100 ml. of water to form a slurry at 90° C.

This slurry was introduced continuously into an agitator to react upon 93 g. of Norwegian dolomite, which was likewise introduced continuously into the agitator. The dolomite had been ground to pass 200 mesh screen. The analysis of the dolomite was:

| | Percent |
|---|---|
| MgO | 21.3 |
| CaO | 30.3 |
| $CO_2$ | 47.4 |
| $R_2O_3$ | 1.0 | and moisture whereby R signifies a metal ion with three valences.

The temperature in the agitator was kept at 90° C. The time of reaction was 2 hours. The final pH obtained was 2.45. Cresol purple can be used as indicator for plant operation but should be checked electrometrically.

The reaction slurry was thereafter brought to react with 84 g. selectively calcined dolomite. The slurry and the slaked selectively calcined dolomite were both introduced continuously into a blunger.

The selectively calcined dolomite had been produced in an electric furnace at a temperature of 780° C. The calcined product contained 25.1% caustic magnesia.

The reaction was carried through its stages of pH=6.3 yellow against methyl red, pH=6.8 violet against bromocresol and reached pH=6.9 measured electrometrically in 1 hour.

Thereafter the reaction mass from the blunger was carried continuously into a granulator provided with screening, circulation and drying facilities together with 160 g. potassium chloride. This potassium chloride product contained 92.5% KCl with 7.5% NaCl and moisture as impurities.

The finished granulated product −4 mm. +2 mm. as obtained from the granulator and drier weighed 610 g. The drying was carried out at 110° C. This product showed the following analysis:

| | Percent |
|---|---|
| $P_2O_5$[1] | 23.5 |
| K | 13.1 |
| MgO | 7.1 |
| CaO | 18.5 |
| Cl | 13.2 |
| Crystal water | 15.0 |
| $CO_2$ | 4.2 |
| $Fe_2O_3$, $Al_2O_3$, $H_2SiF_6$, Na, etc. (not analysed) | 5.0 |

[1] The $P_2O_5$ content was 0.3% insoluble, 1.4% water soluble and 21.8% citrate soluble.

EXAMPLE IV

Production of P, K, Mg fertilizer for wheat with K as $K_2SO_4$

Exactly the same reaction mass from the blunger as in Example I was carried continuously into the granulator together with 190 g. potassium sulphate, containing 49.7% $K_2O$ corresponding to 92.4% $K_2SO_4$. The finished granulated product −4 mm. +2mm. obtained from the granulator and drier weighed 628 g. dried at 110° C. The product showed the following analysis:

| | Percent |
|---|---|
| $P_2O_5$[1] | 22.8 |
| $K_2O$ | 14.7 |
| MgO | 7.05 |
| CaO | 17.6 |
| $SO_3$ | 13.4 |
| Crystal water | 14.3 |
| $CO_2$ | 4.0 |
| $Fe_2O_3$, $Al_2O_3$, $H_2SiF_6$, Na, etc. (not analysed) | 6.15 |

[1] The $P_2O_5$ content was 0.45% insoluble, 2% water soluble and 20.35% citrate soluble.

EXAMPLE V

Production of P, K, Mg fertilizer for wheat with K added in the form of KCl and S in the form of $CaSO_4$ 500 g. of enriched Swedish superphosphate with 28.4% total $P_2O_5$ was pulverized and treated with 200 ml. water. This slurry was introduced continuously into an agitator to react upon 93 g. Norwegian dolomite, which was likewise introduced continuously into the agitator. The dolomite was the same as in Examples I and II.

The temperature in the agitator was kept at 100° C. After a reaction time of 2 hours a pH value of 2.4 was obtained. Cresol purple can be used as indicator for plant operation but should be checked electrometrically. The reaction slurry was thereafter brought to react with 84 g.

of selectively calcined dolomite as in Examples I and II whereby a pH of 5.5 was obtained within 1 hour.

The reaction mass was introduced into the granulator together with 160 g. potassium chloride as in Example I. The finished product dried at 110° C., —4 mm. +2 mm., weighed 755 g. and showed a pH of 6.8 after 24 hours storage.

The product showed the following analysis:

| | Percent |
|---|---|
| $P_2O_5$[1] | 18.8 |
| K | 10.4 |
| Cl | 11.0 |
| MgO | 5.7 |
| CaO | 24.7 |
| $SO_3$ | 11.0 |
| Crystal water | 12.0 |
| $CO_2$ | 3.5 |
| $Fe_2O_3$, $Al_2O_3$, $H_2SiF_6$, Na, etc. (not analysed) | 3.0 |

[1] The $P_2O_5$ content was 0.3% insoluble, 2.0% water soluble and 16.5% citrate soluble.

EXAMPLE VI

Production of P, K, Mg fertilizer for wheat with K added in the form of KCl and S in the form of $CaSO_4$ 750 g. normal Danish superphosphate with 18.95% total $P_2O_5$ was pulverized and treated with 300 ml. water. This slurry was introduced continuously into an agitator to react upon 93 g. Norwegian dolomite, which was likewise introduced continuously into the agitator. The dolomite was the same as in Example I, II and III.

The temperature in the agitator was kept at 100° C. After a reaction time of 2 hours a pH value of 2.4 was obtained. Cresol purple can be applied as an indicator but should be checked electrometrically. The reaction slurry was thereafter brought to react with 84 g. of selectively calcined dolomite as in Examples I, II and III whereby a pH=6 was obtained after one hour.

The reaction mass was introduced into the granulator together with 160 g. potassium chloride as in Examples I and III. The finished product dried at 110° C. —4 mm. +2 mm. weighed 980 g. and showed a pH of 6.8 after 24 hours of storage.

The product showed the following analysis:

| | Percent |
|---|---|
| $P_2O_5$[1] | 14.5 |
| K | 8.0 |
| Cl | 8.3 |
| MgO | 4.6 |
| CaO | 24.5 |
| $SO_3$ | 20.3 |
| Crystal water | 14.0 |
| $CO_2$ | 3.0 |
| $Fe_2O_3$, $Al_2O_3$, $H_2SiF_6$, Na, etc. (not analysed) | 3.0 |

[1] The $P_2O_5$ content was 0.2% insoluble, 1.6% water soluble, 12.7% citrate soluble.

What I claim is:

1. In a process for producing a fertilizer comprising the step of reacting phosphoric acid with ground dolomite, the improvement that the phosphoric acid after having been treated with said ground dolomite is treated with a selectively calcined dolomite selected from the group consisting of unslaked selectively calcined dolomite, $CaCO_3.MgO$, and slaked selectively calcined dolomite, $CaCO_3.Mg(OH)_3$, and that thereafter the reaction mass thus obtained is treated with products containing at least one potassium salt selected from the group consisting of KCl and $K_2SO_4$.

2. A process according to claim 1, wherein the phosphoric acid which is treated first with said ground dolomite and then with said selectively calcined dolomite is supplied to the reaction in the form of an aqueous slurry of at least one phosphate product selected from the group consisting of triple superphosphate, normal superphosphate and enriched superphosphate.

3. A process according to claim 1, comprising recovering of $CO_2$ formed in the treatment of the phosphoric acid with said ground dolomite.

4. A process according to claim 1, wherein trace elements are added in conjunction with said potassium salt addition.

5. A process for producing a P-, K- and Mg-fertilizer in which phosphoric acid is treated first with dolomite ground to a particle size such as to pass through a 200 mesh, 0.074 mm., screen opening, the reaction between said acid and said dolomite being carried out at a temperature of 90–100° C. and being carried to a pH of between 2.4 and 3.5, and is treated subsequently with a selectively calcined dolomite selected from the group consisting of unslaked selectively calcined dolomite, $CaCO_3.MgO$, and slaked selectively calcined dolomite, $CaCO_3.Mg(OH)_2$, the reaction with said selectively calcined dolomite being carried to a pH of between 6.5 and 7.5, whereafter the reaction mass thus obtained is treated with products containing at least one potassium salt selected from the group consisting of KCl and $K_2SO_4$.

6. A process according to claim 5, in which the phosphoric acid supplied to the treatment with said ground dolomite has a concentration of 18–50% $P_2O_5$.

7. A process according to claim 5, comprising recovering of $CO_2$ formed in the treatment of the phosphoric acid with said ground dolomite.

8. A process according to claim 5, wherein trace elements are added in conjunction with said potassium salt addition.

9. A process according to claim 5, wherein the phosphoric acid is supplied to the treatment with said ground dolomite in the form of an aqueous slurry of at least one phosphate product selected from the group consisting of triple superphosphate, normal superphosphate and enriched superphosphate, said slurry containing 7–33% $P_2O_5$.

10. A process according to claim 1, wherein the ground dolomite employed in the first step is an impure dolomite containing up to 2.0 mols $CaCO_3$ per mol $MgCO_3$.

11. A process according to claim 1, for producing a fertilizer for barley, wherein the ground dolomite employed in the first step is an impure dolomite containing 1.02–2.0 mols $CaCO_3$ per mol $MgCO_3$.

12. A process according to claim 1 for producing a fertilizer for rye, maize and oats, wherein the ground dolomite employed in the first step is an impure dolomite containing 1.02–1.5 mol $CaCO_3$ per mol $MgCO_3$.

13. A process according to claim 1 for producing a fertilizer for wheat, wherein the ground dolomite employed in the first step is an impure dolomite containing 1.02–1.5 mol $CaCO_3$ per mol $MgCO_3$, and wherein the weight ratio of this ground dolomite to the selectively calcined dolomite employed in the second step, and calculated as unslaked selectively calcined dolomite, ranges from 1.0:0.2 to 1.0:0.1.

14. A process according to claim 1 for producing a fertilizer for wheat, wherein the ground dolomite employed in the first step is an impure dolomite containing 1.5–2.0 mols $CaCO_3$ per mol $MgCO_3$, and wherein the weight ratio of this ground dolomite to the selectively calcined dolomite employed in the second step, and calculated as unslaked selectively calcined dolomite, ranges from 1:0.5 to 1:0.16.

References Cited

UNITED STATES PATENTS 2,348,343  5/1947  Holbrook _____ 71—41X

REUBEN FRIEDMAN, Primary Examiner

R. BARNES, Assistant Examiner

U.S. Cl. X.R.

71—47, 61